Jan. 10, 1933.   N. K. CHANEY   1,894,158
TREATMENT OF ALIMENTARY PRODUCTS
Filed March 13, 1928
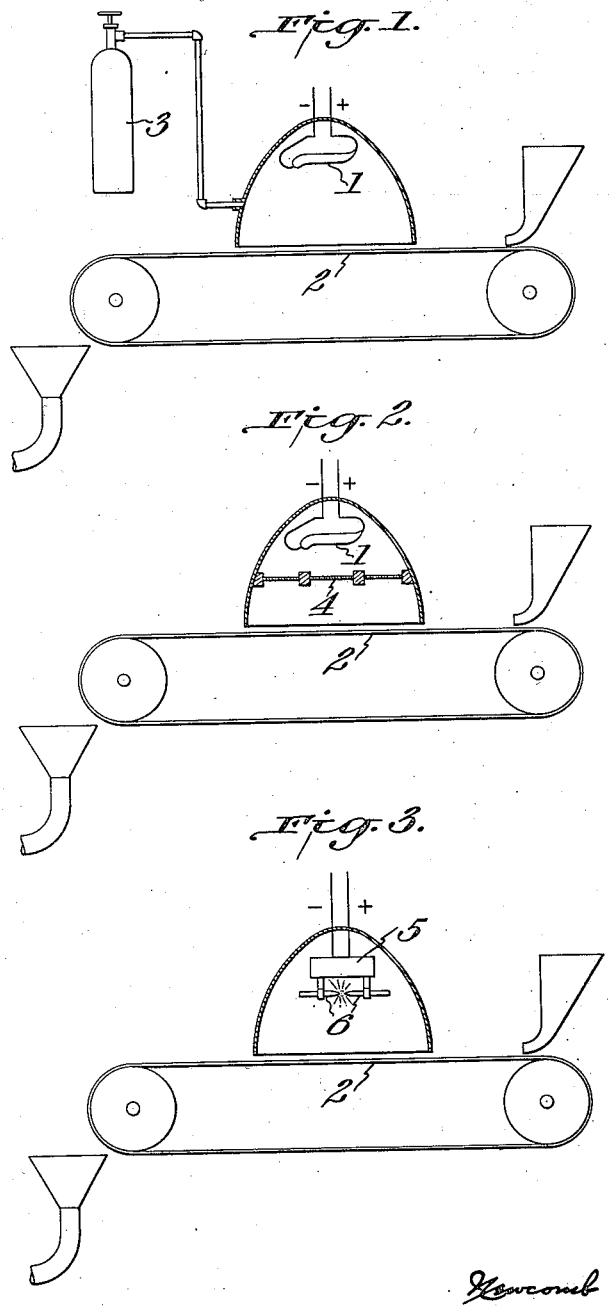

Patented Jan. 10, 1933

1,894,158

UNITED STATES PATENT OFFICE

NEWCOMB K. CHANEY, OF LAKEWOOD, OHIO, ASSIGNOR TO NATIONAL CARBON CO., INC., A CORPORATION OF NEW YORK

TREATMENT OF ALIMENTARY PRODUCTS

Application filed March 13, 1928. Serial No. 261,388.

My invention relates to the processing of food stuffs and alimentary substances in general and particularly to improved means for the irradiation of food-stuffs by ultra-violet light.

It is recognized that certain substances known as "vitamins" are essential to the welfare of the human body, and that these substances are present in various types of fresh foods. It is also known that certain substances, which otherwise contain only small amounts of vitamins may be enriched in vitamins by the influence of ultra-violet light, and when so enriched are preferred and highly valuable food-stuffs. This discovery was first made in connection with certain pure food oils, and has since been found to apply also to various other types of food-stuffs. Efforts have been made to apply the process of irradiation by ultra-violet light to various food-stuffs such as the cereals, in an attempt to improve further the already excellent food values of these substances. It has been found, however, that when nitrogenous materials, or proteins, are present the irradiation sometimes produces a highly objectionable flavor, and a foul taste, which renders the food-stuffs quite undesirable. This effect has been found to be associated with the presence of the protein or nitrogenous material, and in the case of a substance such as an oil, the difficulty is avoidable by heating the oil to precipitate the proteins. But such a procedure is not possible with the cereals, since a removal of the proteins quite completely destroys the character of the food-stuffs.

My invention provides means for the irradiation of food-stuffs, and, in combination therewith, means for preventing the development of the objectionable taste therein.

It has been found that the production of the foul taste is not due to a direct action of the ultra-violet rays upon the protein component of the food-stuff, but is due to a secondary reaction of the ozone produced in the ambient air by the ultra-violet rays, which ozone then reacts with the proteins to develop the objectionable flavor. I find that by the use of my invention for preventing the formation of ozone during the irradiation, it is possible to prevent the development of the objectionable taste.

Other objects and details of my invention will be apparent from the following description, when read in connection with the accompanying drawing, wherein:

Figures 1, 2 and 3 illustrate respective embodiments of my invention, showing means for irradiating food stuffs in the absence of ozone.

As a first embodiment of the system of my invention, I may provide a quartz mercury-arc light 1, as shown in Fig. 1, adapted to the development of large quantities of ultra-violet rays. I further provide convenient means for moving the food-stuffs past the arc light in such way as to expose them to the ultra-violet rays, as by means of a carrying belt 2, a chute, or other convenient device. I further provide in combination with the light source and the conveying means, a source 3, of inert gas such as carbon dioxide, or nitrogen, or other convenient substance, which is substantially free from uncombined oxygen. The source of inert gas 3 is then connected to the space between the light source 1 and the food conveyor 2 to provide a current of the inert gas, displacing the air from the path of the ultra-violet rays between the light and the food-stuff. It is not necessary that all of the oxygen be excluded but only that the amount be greatly reduced.

The rate of production of ozone appears to be a first power function of the amount of oxygen present, and accordingly it is only necessary to restrict the ozone formation to such a degree that its concentration remains below a value which will detrimentally affect the taste. It is found that this result is obtained when the concentration of oxygen is reduced to an amount less than 5% of the amount normally present in air. This proportion has been found suitable for one specific cereal food stuff, which is quite susceptible to oxidation. Other substances may require other proportions of oxygen, the more sensitive substances requiring still lower concentration, and the less sensitive substances permitting of higher concentration.

Thus, by this embodiment as above described, utilizing a non-ozone producing gas around the food-stuffs, I am enabled to apply the desired irradiation of ultra-violet light and develop the desired increase in vitamin content, without the production of an objectionable taste.

The production of ozone and its tendency to introduce an undesirable taste into the food stuff may be prevented in other ways. I find that the production of ozone is caused almost entirely by the shortest of the ultraviolet rays, that is, by those wave lengths shorter than 200 millimicrons. I further find that practically all of the vitamin producing effect is caused by the ultra-violet rays having a wave length greater than 200 millimicrons. Accordingly, by a second embodiment of the device of my invention, I interpose a screen 4 as shown in Fig. 2 between the source of ultra-violet rays 1 and the food being irradiated on the conveyor 2 which transmits ultra-violet rays having a wave length over 200 millimicrons, but which absorbs substantially all those having a wave length less than 200 millimicrons. For this screen, a quartz glass (as distinguished from fused silicon dioxide) may be utilized. I have found the trade product known as "Corex" or No. "980—A" to be satisfactory. Alternatively a liquid screen formed of a layer of 50% ethyl alcohol in pure water, having a thickness of a few centimeters is satisfactory. Or if more dilute alochol solution is used a correspondingly greater thickness is desirable. Such a liquid filter layer may be supported by means of sheets of pure fused silica, and when so constructed a thoroughly practical and useful screen is obtained.

By this second embodiment as thus described I am enabled to obtain a similar result to that obtained by the first mentioned embodiment, that is, a substantial and valuable increase in the vitamin contents of protein containing foods without the development of an objectionable taste.

Alternatively, as a third embodiment, shown in Fig. 3 I may substitute for the quartz mercury-arc as a source of ultra-violet light, a carbon arc lamp 5, utilizing carbons 6 specially treated for the production of large quantities of ultra-violet light. In this embodiment I may provide, as before, means 2 for conveying the food-stuff past a given point at which point is located a suitable arc light mechanism 5 equipped with carbons 6, adapted to the production of ultra-violet light. Such carbons are produced by incorporating in them a plurality of metals such as iron, aluminum, etc., in appropriate form. These carbons are found to yield a large quantity of ultra-violet rays having wave lengths of 200 to 300 millimicrons but yield very small or negligible quantities of ultraviolet rays having wave lengths less than 200 millimicrons. Accordingly, such an arc is substantially free from the tendency to produce ozone in the atmosphere between the light and food-stuffs, but it emits the desired large quantity of ultra-violet rays which produce the desired increase in vitamin content without the development of the objectionable flavor.

By this means also I am enabled to obtain the desired increase in vitamin content without the development of an objectionable taste.

While I have described but three embodiments of the system of my invention, it is capable of still other modifications therefrom without departing from the spirit thereof and it is desired therefore that only such limitations shall be imposed thereon as are required by the prior art or indicated by the appended claims.

I claim as my invention:

1. In the process of imparting antirachitic properties to protein-containing ozone-sensitive food stuffs while avoiding the development therein of objectionable flavor and taste by irradiating the same with ultra-violet rays, the step which consists in subjecting said food stuffs to irradiation from an arc for a sufficient period to fully effect antirachitic activation thereof, said arc being formed between carbon electrodes having an addition material therein whereby the energy emitted will have a high portion of wave lengths between 200 and 300 millimicrons and a negligible proportion of wave lengths shorter than 200 millimicrons.

2. In the process of imparting antirachitic properties to protein-containing ozone-sensitive food stuffs while avoiding the development therein of objectionable flavor and taste by irradiating the same with ultra-violet rays, the step which consists in subjecting said food stuffs to irradiation from an arc for a sufficient period to fully effect antirachitic activation thereof, said arc being formed between carbon electrodes having an addition material therein whereby a large proportion of the energy will be of wave lengths between 200 and 300 millimicrons and a negligible proportion of shorter wave lengths capable of forming ozone.

In testimony whereof, I affix my signature.

NEWCOMB K. CHANEY.